United States Patent [19]

Shamlou et al.

[11] Patent Number: 5,530,398
[45] Date of Patent: Jun. 25, 1996

[54] ACCURATE REFERENCE GENERATION TECHNIQUE VALID DURING SYSTEM POWER-UP TRANSIENTS

[75] Inventors: Daryush Shamlou, Laguna Niguel; Edward MacRobbie, Lake Forest; Rajiv Gupta, Brea; Raouf Halim, Laguna Niguel, all of Calif.

[73] Assignee: Rockwell International Corporation, Seal Beach, Calif.

[21] Appl. No.: 226,126

[22] Filed: Apr. 11, 1994

[51] Int. Cl.⁶ .................................................. H03L 5/00
[52] U.S. Cl. .................... 327/545; 327/539; 327/540; 327/331
[58] Field of Search ................................ 327/465, 535, 327/537, 538, 539, 540, 541, 310, 331, 545; 365/229

[56] References Cited

U.S. PATENT DOCUMENTS

| | | | |
|---|---|---|---|
| 4,382,198 | 5/1983 | Ishijima et al. ........................ | 327/331 |
| 5,132,565 | 7/1992 | Kuzumoto ............................... | 327/541 |
| 5,235,222 | 8/1993 | Kondoh et al. ......................... | 327/541 |
| 5,280,455 | 1/1994 | Kanaishi ................................ | 365/229 |
| 5,347,170 | 9/1994 | Hayakawa et al. ..................... | 327/541 |
| 5,382,839 | 1/1995 | Shinohara .............................. | 327/545 |

Primary Examiner—Timothy P. Callahan
Assistant Examiner—Jung Ho Kim
Attorney, Agent, or Firm—George A. Montanye; David J. Arthur; Philip K. Yu

[57] ABSTRACT

A circuit for converting a system supply voltage having one of two levels to a voltage for use by an integrated analog circuit connected to the system upon power-up. The circuit uses a diode-connected transistor to generate a reference voltage necessary for a regulator to regulate the supply voltage when the supply voltage is first powered up. The regulated supply voltage is doubled to a voltage level sufficient to activate the integrated analog circuit's bandgap voltage. The activated bandgap voltage is thus switched on to supply a more precise reference voltage to the regulator so that the diode-connected transistor may be de-activated to conserve power. The circuit also provides a bypass path for connecting the supply voltage directly to the integrated analog circuit when the supply voltage is the same level as the necessary voltage for the integrated analog circuit.

10 Claims, 7 Drawing Sheets

5,530,398

ACCURATE REFERENCE GENERATION TECHNIQUE VALID DURING SYSTEM POWER-UP TRANSIENTS

RELATED PATENT APPLICATION

The present application is related to Patent Applications entitled EFFICIENT, WELL REGULATED, DC-DC POWER SUPPLY UP-CONVERTER FOR CMOS INTEGRATED CIRCUITS and SUPPLY-DISCRIMINATING SUPPLY-ADAPTIVE ELECTRONIC SYSTEM, filed on the same date, with Ser. Nos: 226,197 and 226,198, respectively, and assigned to the present assignee, Rockwell International Corp. The disclosures of the related applications are incorporated herein by reference.

FIELD OF INVENTION

The present invention relates to electronic systems with supply-adaptive reference generation and more specifically to regulating and supplying to external devices such as PCMCIA cards from the supply of a personal computer.

BACKGROUND OF THE PRESENT INVENTION

It has been the norm for electronic systems to operate from a five-volt power supply, thus requiring their electronic components to operate and meet all requirements from a single 5-volt supply. These requirements may include interfacing logic levels and timing specifications, and may apply to other devices such as other internal circuits. Increasingly, electronic systems, particularly analog IC's, are migrating to a 3.3 volt power supply which conforms to the recently approved JEDEC Standard 8-1A. This standard also defines 3.3 volt-compatible logic levels, which are different from those levels using a 5-volt supply. Although it would be desirable to have electronic components which are capable of conforming to either supply standard, redesigning the components and their front-end structures for operations on a 3-volt supply would create delays and uncertainties.

To further complicate the problem, in many system applications, it is not known beforehand whether the supply will be 5-volt or 3.3-volt. An example of this scenario is the PCMCIA-compatible cards, which may be functional at 3.3 volt but plugged into a 5-volt system such as a laptop computer. Detection and adaptation by the PCMCIA card thus become an integral part of the power-on process. Without the procedure prior to power-on, the PCMCIA card may be operating under an incompatible supply and system configuration.

Conventionally, to provide 3.3 volt supply to an [PCMCIA circuit or] integrated analog ("IA") circuit, which operates at a 5 volt level, a voltage regulator and voltage doubler are implemented with the IA circuit. The voltage regulator and voltage doubler generate a DC voltage of 5 volt regardless of the system power supply being 5 volt or 3.3 volt. This approach allows the 5-volt components of a system, such as a PCMCIA card for a notebook computer to be functional with both 5-volt and 3.3-volt supplies without the need to redesign the existing components.

The conventional approach, however, requires the system to generate an accurate reference voltage for the voltage regulator and voltage doubler so that the voltage generated thereafter is as close to 5 volt as possible. Although most IA circuits have an on-chip bandgap reference voltage, this bandgap reference voltage in many cases may only be operational under a 5-volt steady supply. Since the voltage regulator and voltage doubler also require an accurate reference voltage to generate a DC voltage of about 5 volt for invoking the bandgap voltage, the voltage regulator and voltage doubler cannot use the bandgap reference voltage as their reference voltage during system power-up transients. Therefore, it would be desirable to generate an accurate reference voltage, irrespective of the 3.3-volt or 5-volt power supply from the system, for the voltage regulator and voltage doubler to generate a 5-volt DC voltage so as to activate the bandgap reference voltage. It would also be desirable to use the bandgap reference voltage, solely, once the voltage regulator and voltage doubler are stabilized after the power-up transients have settled.

Furthermore, if the power supply from the system is already 5 volts, it would be desirable to take advantage of it directly by subsequently bypassing the voltage regulator and voltage doubler loop. This objective would require a mechanism of detecting whether the system supply is 5 volt or 3.3 volt. Once the detection is completed, the information can help the system reconfigure its own interfaces and other internal circuitry accordingly.

With respect to the voltage regulator and voltage doubler, it is also desirable to have an efficient DC-DC up-converter for converting a system supply voltage for the IA circuit without going above the CMOS processing tolerance.

SUMMARY OF THE PRESENT INVENTION

Therefore, it is an object of the present invention to have an accurate reference generator which is valid during system power-up transients for the voltage regulator and voltage doubler;

It is also an object to have an efficient voltage regulator and voltage doubler without going above the CMOS process tolerance regardless of whether the supply voltage is 3.3 volt or 5 volt;

It is also an object to be able to detect the voltage supply and to bypass the voltage regulator and voltage doubler when the voltage supply is 5 volt or when the voltage supply is consistent with the requirements of the IA circuit;

It is another object to be able to use the information regarding the status of the system power supply for reconfiguring the system even when the system is in "standby" mode.

A circuit is disclosed for converting a system supply voltage having one of two levels to a voltage for use by an IA circuit connected to the system upon power-up. The circuit generates a reference voltage necessary for a regulator to regulate the supply voltage when the supply voltage is first powered up. The regulated supply voltage is doubled to a voltage level sufficient to activate the IA circuit's bandgap voltage. The activated bandgap voltage is thus switched on to supply a more precise reference voltage to the regulator so that the diode-connected transistor may be de-activated to conserve power. The circuit also provides a bypass path for connecting the supply voltage directly to the IA circuit when the supply voltage is the same level as the necessary voltage for the IA circuit.

BRIEF DESCRIPTION OF THE DRAWINGS

Additional objects, features and advantages of the present invention will be apparent to those skilled in the ad from the following description, wherein.

DETAILED DESCRIPTION OF THE DRAWINGS

Figure 1:
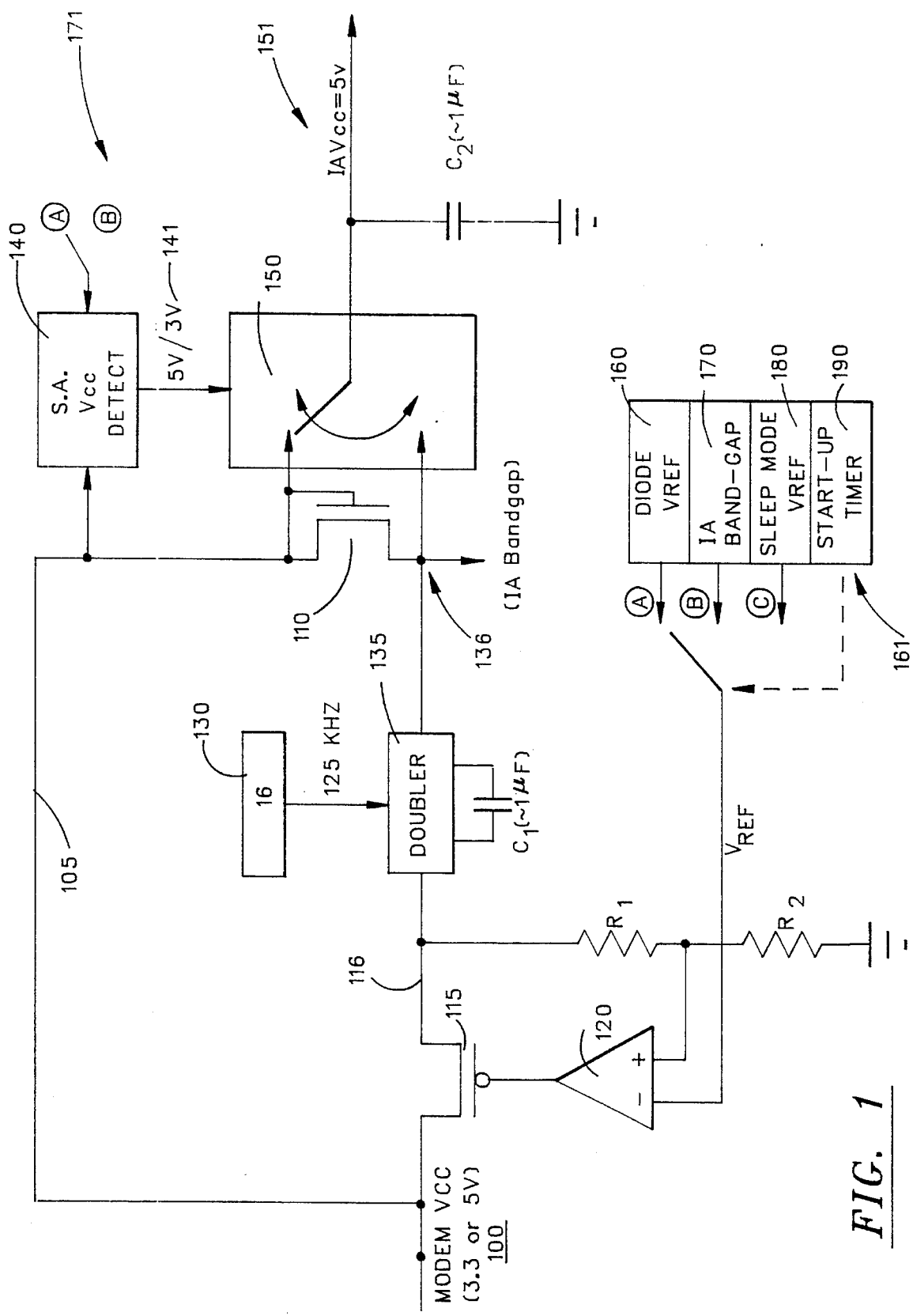
FIG. 1 illustrates a functional block diagram of a supply-adaptive voltage generation circuit in accordance with the present invention.

Reference is made to FIG. 1, where a functional block diagram of a supply-adaptive IA voltage generation circuit in accordance with the present invention is illustrated. Modem VCC 100 for the IA can be either 3.3 volt or 5 volt as supplied by a system such as a notebook computer. Modem VCC 100 is applied to a voltage regulator, which is formed by p-channel transistor 115, amplifier 120 and resistors R1 and R2. Voltage doubler 135 is coupled to the output of the voltage regulator at node 116. The operation of voltage doubler 135 is driven by clock 130. Currently the clock rate is set at 125 KHz. Output node 136 of voltage doubler 135 is connected to IA VCC node 151 through switch 150. It should be appreciated by those skilled in the art that modem VCC 100 represents the 3.3 V or 5 V which are supplied by a system such as a personal computer, while IA VCC 151 represents the 5 volt VCC operating an IA circuit such as a PCMCIA card.

Bypass path 105 connects between modem VCC 100 and switch 150. The output of switch is applied to IA VCC at node 151 at 5 volt for the IA circuit. Supply-adaptive ("SA") VCC detection circuit 140 is connected to bypass path 105 and generates a control signal 141 (5 volt or 3 volt) for switch 150 to control switching. Reference generation circuit 161 has three modes: diode reference 160(A), IA bandgap reference 170(B) and sleep mode reference 180(C). Start-up timer 190 facilitates the necessary switching among the three reference voltages. Diode reference 160 (A) and Bandgap reference 170(B) can also be used for the IA circuit as IA reference 171. A diode-connected N-channel transistor 110 is connected between modem VCC 100 and node 136 for providing an initial voltage drop at node 136 when modem VCC 100 is first powered up.

The operation of the IA voltage generation circuit of the present invention is described as follows. When modem VCC 100 is first powered up toward its final 3.3 volt or 5 volt target level, diode reference voltage 160, which currently is a forward-biased diode-connected PNP transistor (to be described in FIG. 2), provides the requisite reference voltage for amplifier 120 of the voltage regulator. Node 116 is thus regulated at about 2.75 volt, without regard to whether modem VCC 100 is a 3.3 volt or 5 volt supply.

Figure 3:
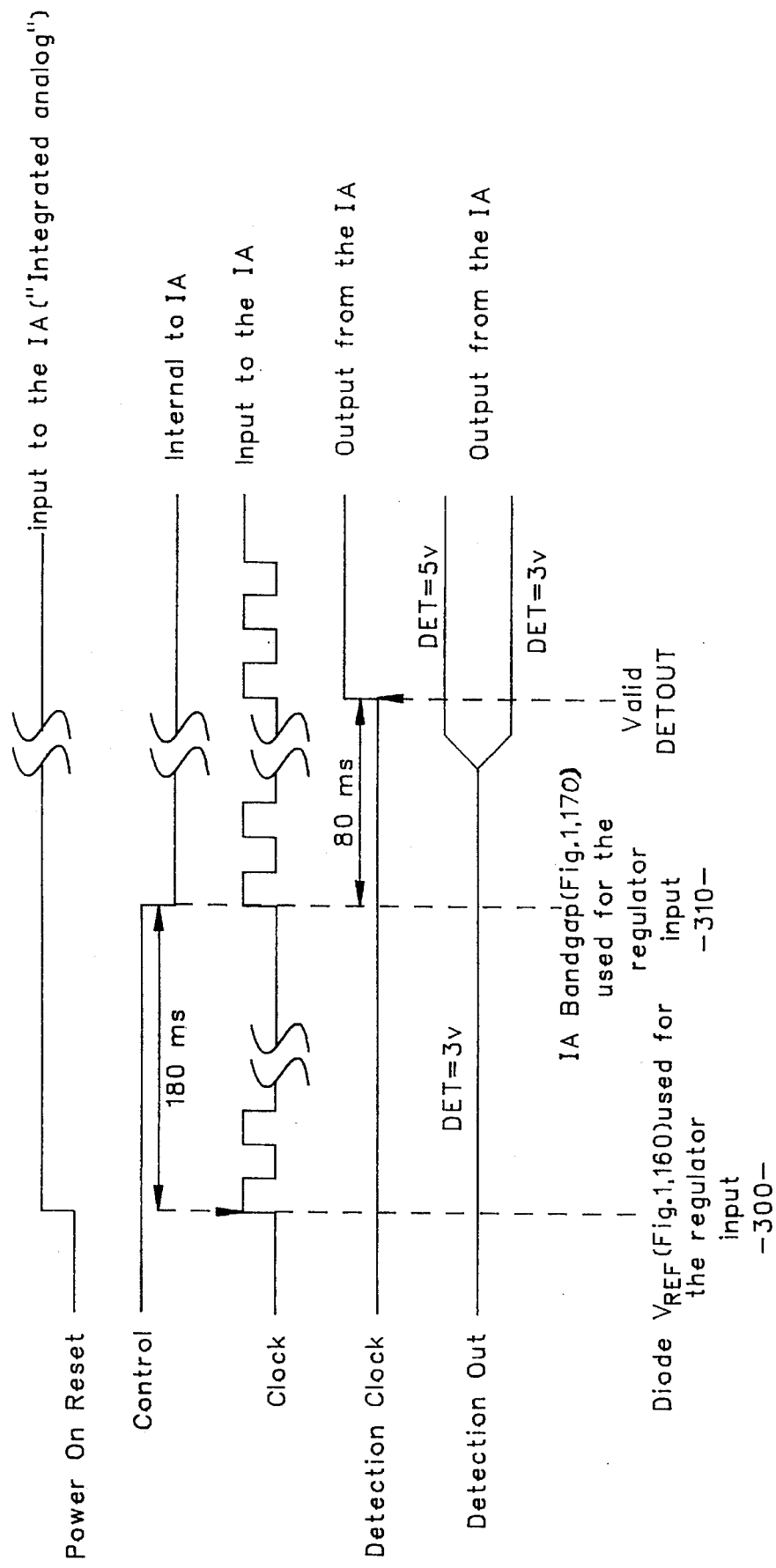
FIG. 3 illustrates a timing diagram for the supply-adaptive internal voltage generation circuit.

The voltage at node 116 is multiplied by voltage doubler 135 to about 5 volt at node 136, which is sufficient to activate the bandgap voltage of the IA device such that IA bandgap voltage 170(B) can now be used as a more precise voltage reference for the regulator's amplifier 120 after a predetermined time delay for modem VCC 100 to settle. A timing diagram is shown in FIG. 3, where diode reference 160(A) is first used as input to the regulator upon power-on reset (POR) and IA bandgap reference 170(B) is used after the 180 ms delay, as currently implemented.

Referring to FIG. 1, switch 150 is used to switch IA VCC 151 to modem VCC 100 through bypass 105 when modem VCC 100 is 5 volt as detected by SA VCC detector 140. This feature is advantageous in that once a 5 volt modem VCC is detected, it can readily supply the 5 volt to IA VCC 151 without the redundancy of operating the regulator and doubler circuitry.

As those skilled in the art will appreciate, IA bandgap voltage 170 is generally more precise as reference voltage than forward-biased diode 160 such that once IA bandgap voltage 170 is activated, diode reference voltage 160 can be de-activated to reduce power consumption.

"Sleep" mode reference voltage 180 generates the reference voltage for amplifier 120 of the regulator when the IA circuit is reviving from sleep mode, i.e. when the IA circuit is not used by the system for an extended period of time. When the IA circuit goes to sleep mode, so does its bandgap voltage reference to save power such that a reference voltage is needed for the voltage regulator when it awakens. However, sleep mode is different from the power-up situation because the voltage level supplied by modem VCC 10( s already known and detected prior to sleep mode.

As such, sleep mode reference voltage 180 preserves the information on the level of the supply voltage so that the IA circuit need not go through the delay again in determining modem VCC 100 when it is awakening from sleep mode. The operation of sleep mode 180, as well as diode and bandgap references 160, 170, will be described in connection with FIG. 2.

Figure 2:
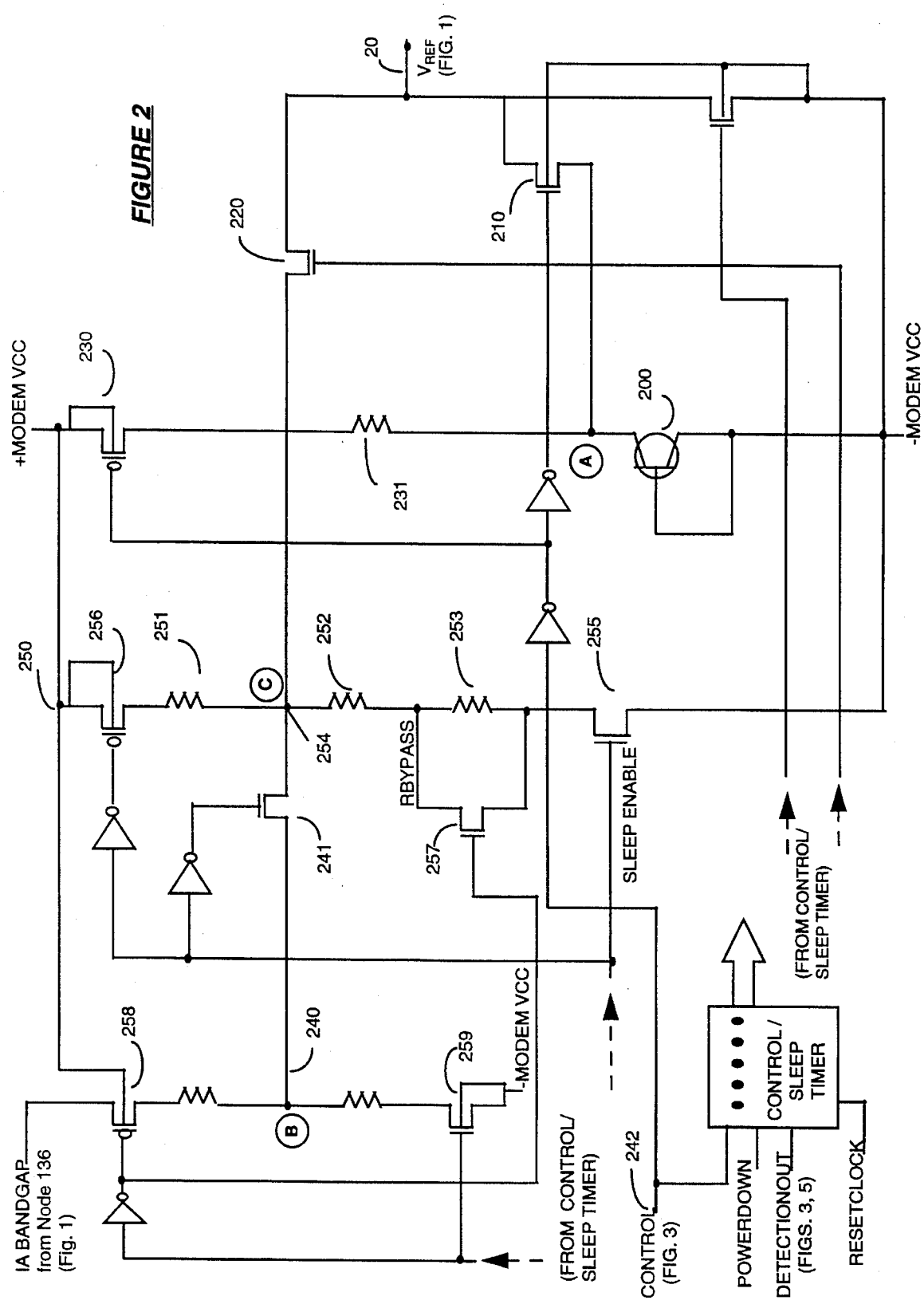
FIG. 2 illustrates a circuit diagram of the reference generator for the diode reference, bandgap reference and sleep mode reference as incorporated in the present invention.

Reference is made to FIG. 2, where a circuit diagram of reference generator 161 (FIG. 1) for diode reference 160, bandgap reference 170 and sleep mode reference 180 is further illustrated. As shown in FIG. 2, n-channel transistors 210, 220 and 241 control the switching among the three modes of reference voltages: diode reference voltage 200(A), bandgap reference voltage node 240(B) and sleep mode reference voltage node 254(C). Transistor 210 is turned on by Control 242. Diode-connected PNP transistor 200, resistor 231 and p-channel transistor 230 form the connection when the reference is generated by the diode reference voltage 160(A) of FIG. 1.

The bandgap reference voltage 170(B) (FIG. 1) is available at node 20 when both transistors 220, 241 are turned on and transistor 210 is turned off. Sleep mode (C) can be activated when transistor 241 is turned off to cut off the voltage at node 240 from node 254. Also, transistors 255, 256, 257 are turned on when sleep mode is activated. Also during sleep mode, transistors 258 and 259 are turned off to break the d.c. path to save power.

When coming out of sleep mode, control/sleep timer 25 opens a switch at transistor 257 by turning it off so that the voltage level at node 254 is boosted until node 254 is stabilized. Timer 25 and transistors 255 and 256 are then turned off and transistor 241 is turned on to go back into normal operation.

Upon power-up, transistors 200, 210, 230 and resistor 231 are turned on to provide the reference voltage at node 20. This voltage 4 at node 20 can be used as a reference voltage for regulator 120 in FIG. 1 as Vref. After power supply at node 151 FIG. 1 (IAVcc) settles to around 5 volt, the voltage level at node 240 reaches about 1.25 volt. At this time transistors 210 and 230 are turned off while transistors 220 and 241 are turned on to provide the 1.25 volt at node 240 to node 220 so that it can be used as the regulator (120, FIG. 1) input at node 20. During this normal process, transistors 256 and 255 are turned off.

When this system is in sleep mode, transistors 255, 256 and 257 are turned on and transistors 241, 258, and 259 are turned off. As described above, transistors 258 and 259 are turned off to break the d.c. path to conserve power during the sleep mode.

During sleep mode, resistor divider formed by resistors 251 and 252 provides about 1.25 volt at node 120 to be used as the regulator input. However, it should be noted that the voltage level is preserved during sleep mode when the supply voltage is already detected at 3.3 volts. If the supply voltage is detected at 5 volts, then no information would need to be kept, because the system can readily use the supply voltage as it awakens in a 5 volt condition. In this case, the voltage regulator and multiplier can thus be disabled during sleep mode for the 5 volt condition detected.

When coming out of sleep mode, a control and sleep timer 25 would delay the turning off of transistors 255 and 256 until the voltage level at node 240 is about 1.25 volts. Transistors 258 and 259 are also turned on. Transistor 257 is also turned off to provide more boost to the system that is coming out of sleep mode. When voltage at node 240 is settled, timer 25 goes on to turn off transistor 255 and 256 and to turn on transistor 241.

When transistor 241 is on, normal mode proceeds. At this time the voltage level at node 240, about 1.25 volts, would provide the necessary voltage for node 20.

Reference is to FIG. 3, where a timing diagram for the supply-adaptive IA voltage generation is illustrated. Note that the diode reference is first used at 300 as an input to the regulator. A predetermined delay later, the band-gap reference voltage is activated and can be used as an input to the regulator at 310. Another time delay later, currently set at 80 ms, a valid detection of the modem VCC is made with the Detection Clock going high.

Figure 4:
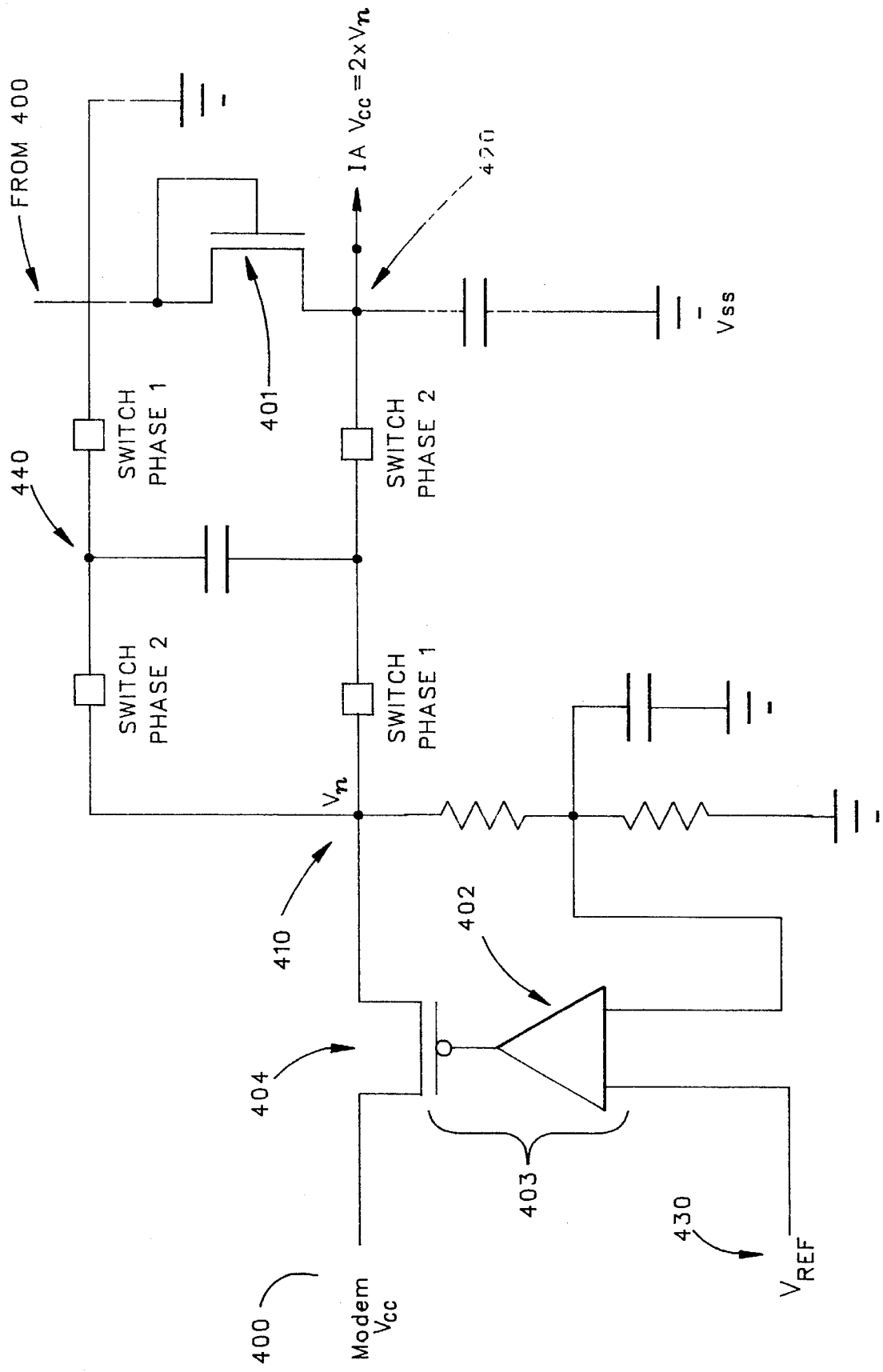
FIG. 4 illustrates a novel DC-DC power supply converter incorporated in the present invention.

Reference is made to FIG. 4, where an efficient and well-regulated DC-DC power supply converter as incorporated in the present invention is illustrated. Modem Vcc 400 is first used to generate a voltage drop across diode-connected n-channel transistor 401 at node 420 for providing the start-up conditions. Modem Vcc 400 is then regulated by regulator 403 formed by transistor 404 and amplifier 402. Once the modem Vcc is regulated at node 410 (Vn), voltage doubler 440 doubles it to generate a supply for the IA circuit at node 420, which is equal to two times Vn at node 410. As such, the IA Vcc can be made a real-number multiple of supply voltage 400 by using voltage drop 401 and doubler 440. Switches, as illustrated in FIG. 4, act to provide the phases 1 and 2 needed for doubling the voltage from node 410 to node 420. Those skilled in the art would appreciate that other switching mechanism may be implemented to take full advantage of the present invention.

Figure 5:
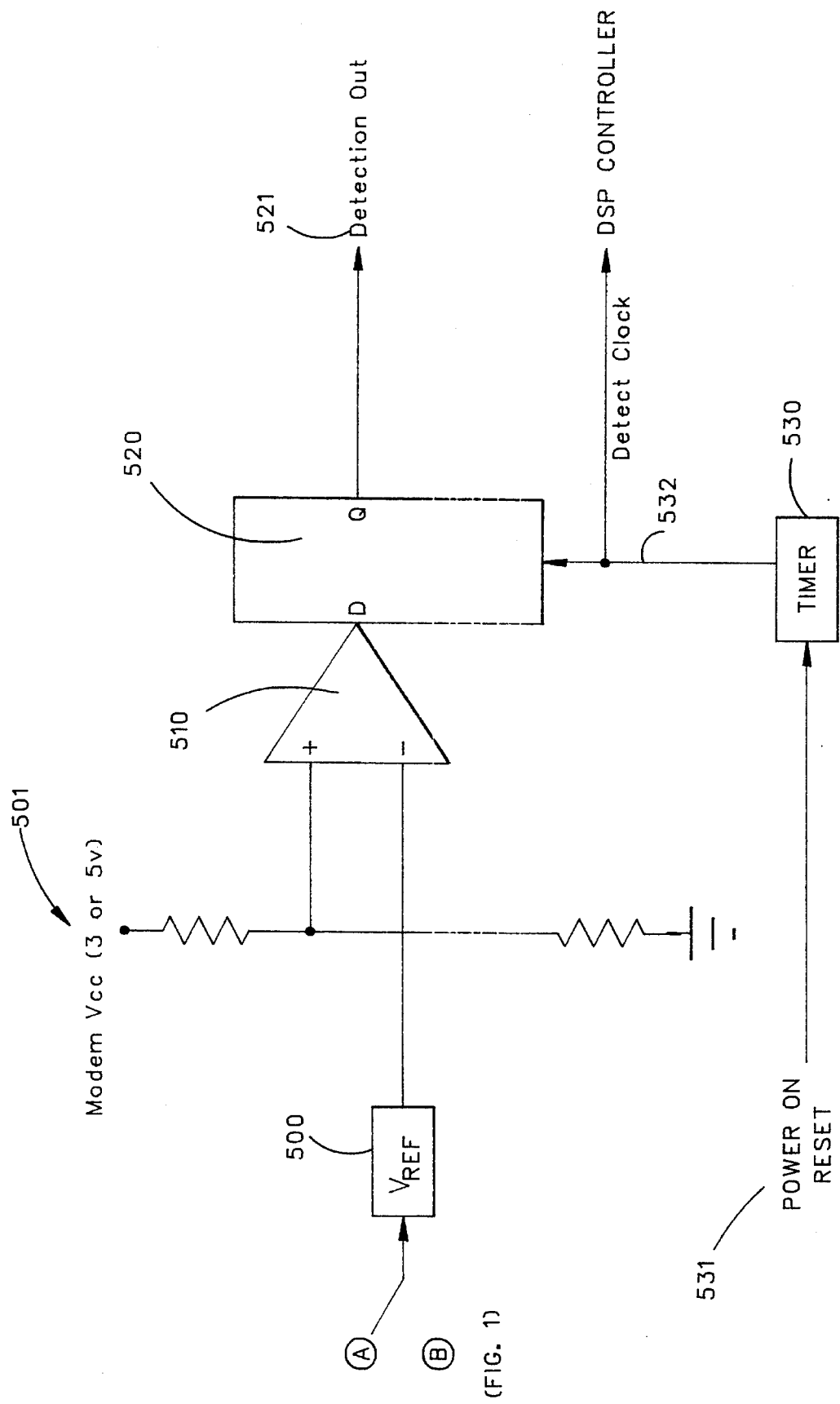
FIG. 5 illustrates a circuit diagram of a novel supply-adaptive VCC detection circuit incorporated in the present invention.

Referring to FIG. 5, a circuit diagram of a novel supply-adaptive Vcc detect circuit 140 (FIG. 1) incorporated in the present invention is illustrated. The inverting input to comparator 510 a voltage Vref from is reference generator 500, which may come from a temperature-regulated supply-insensitive reference generator. The non-inverting input to comparator 510 is from a node of a resistor divider for modem Vcc 501, which is either 3.3 volt or 5 volt. The output of comparator 510 is applied to latch 520, which is clocked by Detection Clock 532 from timer 530. Detection Clock 532 is also used to reset other components during power-on. Timer 530 is reset by power-on reset (POR) 531 when the system supply voltage is first turned on.

During the initial application of a power-on reset (POR), timer 530 holds Detection Clock 532 low for a predetermined time, ensuring that all devices are to be held in reset state upon power-on. Comparator 510 then compares the divided-down modem Vcc 501 with a voltage generated by Vref 500. If Vcc 501 is 5 volt, comparator 510 output is high and a "1" is latched. If Vcc 501 is 3.3 volt, a "0" is latched. At the end of the time delay, Detection Out 521 is thus a valid indication modem of Vcc 510, and Detection Clock 532 goes high allowing all other devices to come out of reset with configuration consistent with modem Vcc 501.

Figure 6:
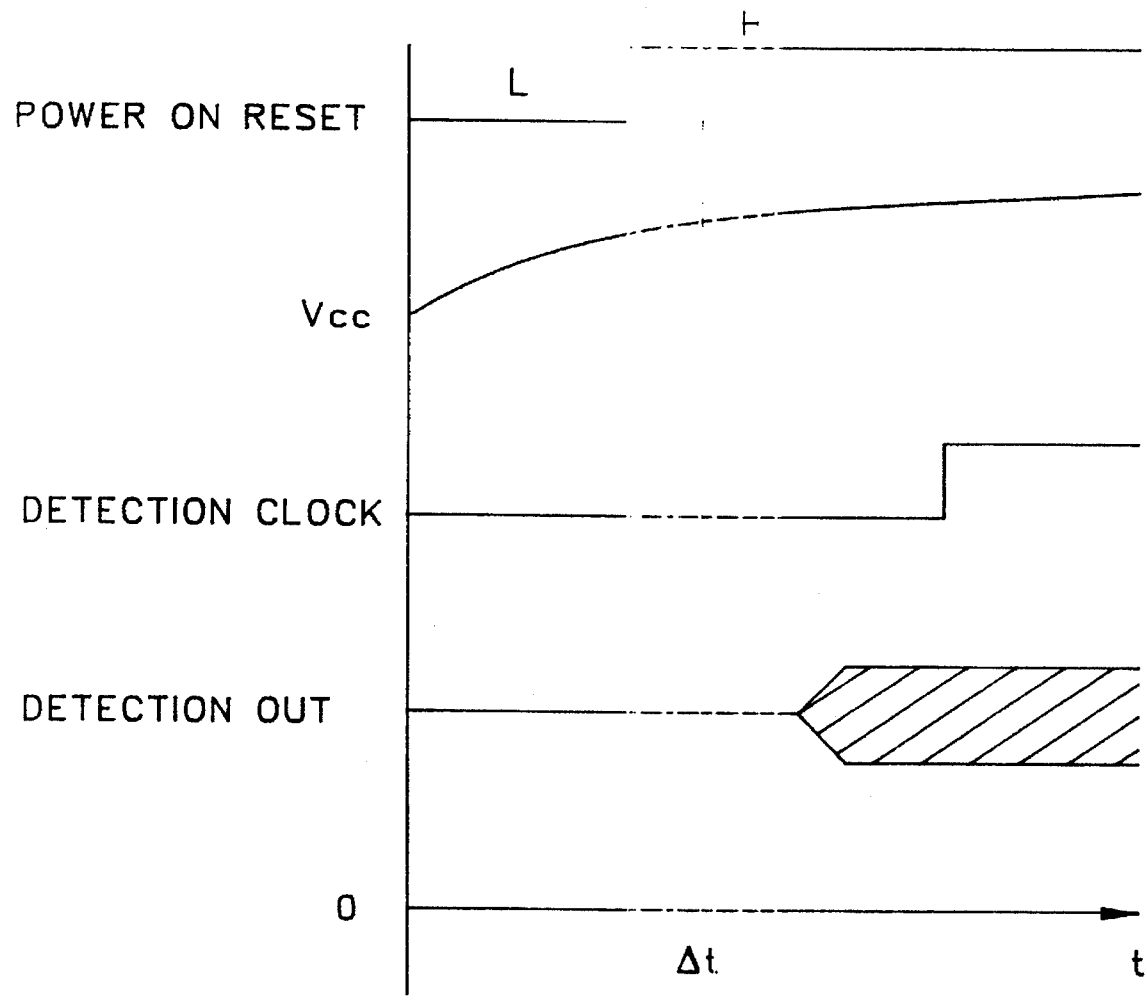
FIG. 6 illustrates the timing behavior of the supply-adaptive detection circuit.

Those skilled in the art will appreciate the advantages of using Detection Clock 532 in accordance with the present invention. Because other devices are also in reset while the supply discriminating circuit is making its detection, there is little noise on modem Vcc 501 such that comparator 510 can compare accurately. Also, it ensures that when the complete system starts operating, it is already correctly configured for the supply voltage used in the system. FIG. 6 illustrates the timing relationship.

Figure 7:
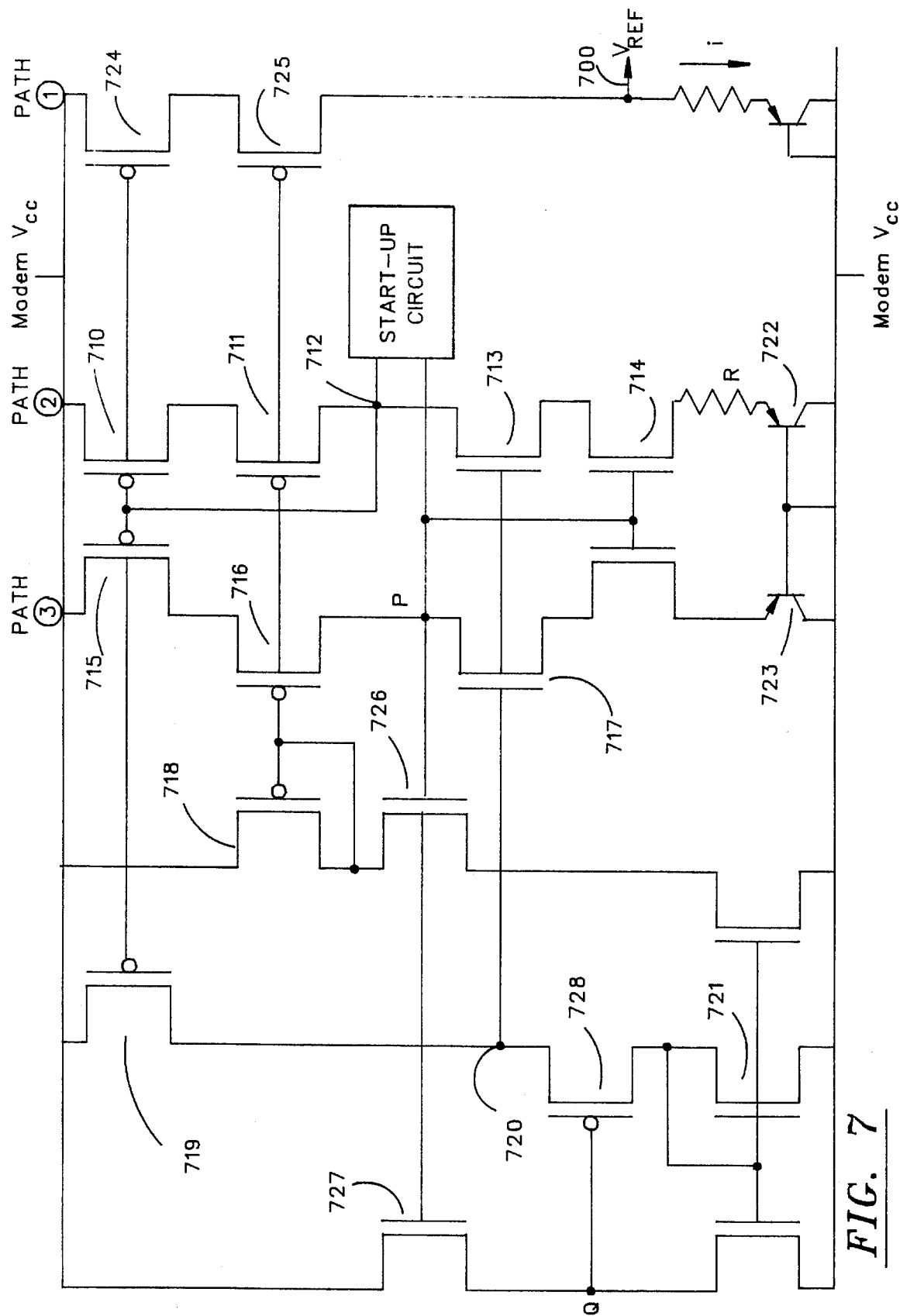
FIG. 7 illustrates the circuit diagram of another embodiment of the reference generation circuit for the voltage regulator shown in FIG. 1.

Reference is made to FIG. 7, where another embodiment of reference generation circuit for the voltage regulator shown in FIG. 1 is illustrated. This reference voltage generation circuit is capable of providing a bandgap reference voltage operational across the entire voltage range of the (Modem Vcc), i.e. from 3 volt to about 5.25 volt. The biasing scheme including level-shifting, as shown, is necessary for low-voltage operation, which may be below 3.0 volt. Currently, the biasing scheme works down to as low as: Vgs(p-channel)+V(diode)+3 Vdsats, or approximately 2.5-plus volt.

Referring to FIG. 7, in order to generate a bandgap Vref at node 700 of about 1.2 volt, p-channel transistor 710 is biased by p-channel transistors 715, 719. P-channel transistor 711 is biased by transistors 716, 718. N-channel transistor 713 is biased by n channel transistor 717 and node 720. Notice that node 720 is derived from level-shifting the voltage at node P by transistors 727, 728 successively. The net result is that current paths 1, 2, and 3 experience identical currents and Vref is equal to the diode voltages at transistors 710, 711, 713 plus (i times R).

What is claimed is:

1. A circuit for providing a predetermined internal voltage to an integrated circuit from a supply voltage during a power-up of a system by using a predetermined internal bandgap voltage source for generating a predetermined bandgap voltage, said supply voltage having one of two levels, comprising:

reference generator means for generating a first reference voltage upon said power-up of said system;

voltage regulator means for regulating said supply voltage to a first predetermined voltage by using said first reference voltage;

voltage multiplier means for multiplying said first predetermined voltage to be substantially equal to said predetermined internal voltage to activate said predetermined internal bandgap voltage source, said predetermined bandgap voltage source thus generating said predetermined bandgap voltage;

first switching means responsive to said predetermined bandgap voltage for disabling said reference generator means and applying said predetermined bandgap voltage as a second reference voltage to said voltage regulator means a predetermined delay after said power-up of said system, such that said reference generator means is de-activated when said predetermined internal bandgap voltage source is activated as said second reference voltage.

2. A circuit according to claim 1, wherein said reference generator means comprises:

a diode-connected transistor being forward biased to generate said first reference voltage upon said power-up.

3. A circuit according to claim 2, further comprising:

bypass means for supplying said supply voltage directly to said integrated circuit, said bypass means being operative when said supply voltage is equal to said predetermined internal voltage;

detection means for determining whether said supply voltage is at one of said two levels, said detection means activating said bypass means when said supply voltage is equal to said predetermined internal voltage, said detection means referencing said predetermined internal bandgap voltage source;

second switching means for selecting voltages from either one of said bypass means and said voltage multiplier means according to whether said supply voltage is equal to said predetermined internal voltage.

4. A circuit according to claim 3, further comprising:

sleep mode means coupled to said first switching means for generating a third reference voltage for said voltage regulator means when said circuit is inactive.

5. A circuit for supplying a predetermined internal voltage to a peripheral device of a system from a supply voltage of said system upon a power-up of the system, said supply voltage being at either one of first and second levels, comprising:

first reference generator means coupled to said peripheral device for generating a first reference voltage upon said power-up of said system;

voltage regulator means coupled to said first reference generator means for receiving and regulating said supply voltage from the system to produce a regulated voltage at a predetermined voltage level by using said first reference voltage;

multiplier means coupled to said regulator means for raising said predetermined voltage level to be substantially equal to said first level of said supply voltage;

bandgap reference generator means coupled to said voltage regulator means and said multiplier means for generating a predetermined bandgap reference voltage for said voltage regulator means when said predetermined voltage level is regulated at substantially said first level after a predetermined delay after said power-up, said delay allowing said supply voltage from the system to stabilize from said power-up;

switching means coupled to said first reference generator means, said bandgap reference generator means and said regulator means for causing said predetermined bandgap voltage to be applied to said regulator means as a second reference voltage for thereafter regulating said supply voltage from said system to produce a regulated voltage at said predetermined voltage level, said switching means also disabling said first reference generator means when said bandgap reference generator means is activated after said power-up.

6. A circuit according to claim 5, further comprising:

detection means coupled to the system for detecting said supply voltage upon said power-up consecutively using said first and second reference voltages from said first reference generator means and said bandgap reference generator means, said detection means generating a predetermined signal when said supply voltage is equal to said predetermined internal voltage;

bypass means for applying said supply voltage to said peripheral device, said bypass means being activated by said predetermined signal from said detection means to directly apply said supply voltage to said peripheral device as said internal voltage.

7. A circuit according to claim 6, further comprising:

sleep mode reference means coupled to said voltage regulator means for providing a third reference voltage for said voltage regulator means when said system returns from a state of reduced activity after the system has been idle for a predetermined time, said sleep mode reference means remaining coupled to said supply voltage to allow said peripheral device to remain configured.

8. A circuit according to claim 6, wherein first reference generator means comprises a diode-connected transistor being forward-biased to generate said first reference voltage upon said power-up.

9. A method of providing a predetermined internal voltage to an integrated circuit from a supply voltage of a system upon a power-up of the system, by using a bandgap voltage source for generating a predetermined bandgap voltage, said supply voltage being at one of two levels, comprising the steps of:

providing a first reference voltage upon said power-up;

supplying said first reference voltage to a voltage regulator as its reference for regulating said supply voltage to produce a regulated voltage upon said power-up;

said voltage regulator regulating said supply voltage to produce a regulated voltage at a first predetermined voltage;

raising said first predetermined voltage with a voltage multiplier to be substantially equal to said predetermined internal voltage;

applying said first predetermined voltage to said bandgap voltage source to generate said bandgap voltage after a predetermined time delay after said power-up of the system;

supplying said bandgap voltage to said voltage regulator as its reference after said supply voltage from the system stabilizes after said predetermined time delay from said power-up of the system.

10. A method according to claim 9, wherein the step of supplying a first reference voltage comprises:

activating a forward-biased diode-connected transistor to generate said first reference voltage upon said power-up.

* * * * *